United States Patent
Alben et al.

(10) Patent No.: US 11,842,280 B2
(45) Date of Patent: Dec. 12, 2023

(54) LOSS-SCALING FOR DEEP NEURAL NETWORK TRAINING WITH REDUCED PRECISION

(71) Applicant: NVIDIA Corporation, Santa Clara, CA (US)

(72) Inventors: Jonah Alben, San Jose, CA (US); Paulius Micikevicius, Santa Clara, CA (US); Hao Wu, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1355 days.

(21) Appl. No.: 15/971,884

(22) Filed: May 4, 2018

(65) Prior Publication Data

US 2018/0322391 A1    Nov. 8, 2018

Related U.S. Application Data

(60) Provisional application No. 62/561,499, filed on Sep. 21, 2017, provisional application No. 62/502,333, filed on May 5, 2017.

(51) Int. Cl.
  *G06N 3/084*    (2023.01)
  *G06N 3/04*    (2023.01)
  *G06N 3/063*    (2023.01)

(52) U.S. Cl.
  CPC .............. *G06N 3/084* (2013.01); *G06N 3/04* (2013.01); *G06N 3/063* (2013.01)

(58) Field of Classification Search
  CPC ............................... G06N 3/084; G06N 3/063
  See application file for complete search history.

(56) References Cited

U.S. PATENT DOCUMENTS

| | | |
|---|---|---|
| 2014/0067738 A1 | 3/2014 | Kingsbury |
| 2014/0229158 A1 | 8/2014 | Zweig et al. |
| 2016/0321542 A1 | 11/2016 | Towal |
| 2017/0011279 A1 | 1/2017 | Soldevila et al. |
| 2017/0330068 A1* | 11/2017 | Yu ........................ G06N 3/0454 |
| 2018/0315157 A1* | 11/2018 | Ould-Ahmed-Vall ...................... G06N 20/00 |

OTHER PUBLICATIONS

Alistarh, D., Grubic, D., Li, J., Tomioka, R. and Vojnovic, M., 2016. QSGD: communication-optimal stochastic gradient descent, with applications to training neural networks. arXiv preprint arXiv:1610.02132. (Year: 2016).*

(Continued)

*Primary Examiner* — Eric Nilsson
(74) *Attorney, Agent, or Firm* — Davis Wright Tremaine LLP

(57) ABSTRACT

In training a deep neural network using reduced precision, gradient computation operates on larger values without affecting the rest of the training procedure. One technique trains the deep neural network to develop loss, scales the loss, computes gradients at a reduced precision, and reduces the magnitude of the computed gradients to compensate for scaling of the loss. In one example non-limiting arrangement, the training forward pass scales a loss value by some factor S and the weight update reduces the weight gradient contribution by 1/S. Several techniques can be used for selecting scaling factor S and adjusting the weight update.

32 Claims, 14 Drawing Sheets
(2 of 14 Drawing Sheet(s) Filed in Color)

(56) References Cited

OTHER PUBLICATIONS

De Sa, C., Zhang, C., Olukotun, K. and Ré, C., 2015. Taming the wild: A unified analysis of hogwild!-style algorithms. Advances in neural information processing systems, 28, p. 2656. (Year: 2015).*
Hwang, K. and Sung, W., Oct. 2014, Fixed-point feedforward deep neural network design using weights+ 1, 0, and- 1. In 2014 IEEE Workshop on Signal Processing Systems (SiPS) (pp. 1-6). IEEE. (Year: 2014).*
Krizhevsky, Alex. "One weird trick for parallelizing convolutional neural networks." arXiv preprint arXiv: 1404.5997 (2014). (Year: 2014).*
Achanta, Sivanand, Tejas Godambe, and Suryakanth V. Gangashetty. "An investigation of recurrent neural network architectures for statistical parametric speech synthesis." Sixteenth Annual Conference of the International Speech Communication Association. 2015. (Year: 2015).*
Venkataramani, Swagath, et al. "AxNN: Energy-efficient neuromorphic systems using approximate computing." 2014 IEEE/ACM International Symposium on Low Power Electronics and Design (ISLPED). IEEE, 2014. (Year: 2014).*
Zhou, Shuchang, et al. "Dorefa-net: Training low bitwidth convolutional neural networks with low bitwidth gradients." arXiv preprint arXiv:1606.06160 (2016). (Year: 2016).*
Neelakantan, Arvind, et al. "Adding gradient noise improves learning for very deep networks." arXiv preprint arXiv: 1511.06807 (2015). (Year: 2015).*
Zur, Richard M., et al. "Noise injection for training artificial neural networks: A comparison with weight decay and early stopping." Medical physics 36.10 (2009): 4810-4818. (Year: 2009).*
Gemulla, Rainer, et al. "Large-scale matrix factorization with distributed stochastic gradient descent." Proceedings of the 17th ACM SIGKDD international conference on Knowledge discovery and data mining. 2011. (Year: 2011).*
Mathieu, Michael, Camille Couprie, and Yann LeCun. "Deep multi-scale video prediction beyond mean square error." arXiv preprint arXiv:1511.05440 (2015). (Year: 2015).*
International Search Report and Written Opinion of the International Searching Authority dated Sep. 20, 2018, issued in related International Application No. PCT/US2018/031356, 9 pages.
International Search Report and Written Opinion of the International Searching Authority dated Nov. 14, 2019, issued in related International Application No. PCT/US2018/031356, 8 pages.

* cited by examiner

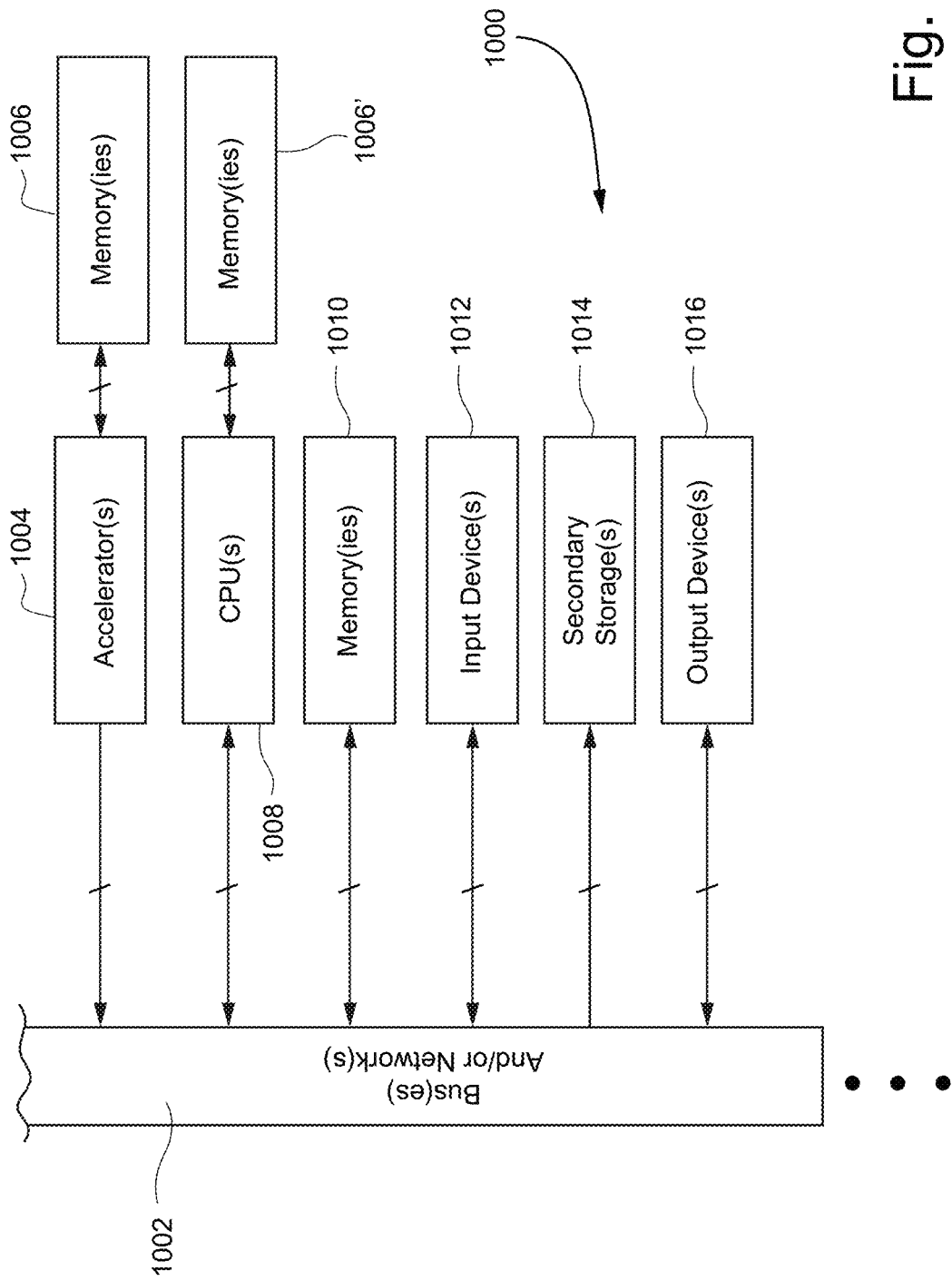

LOSS-SCALING FOR DEEP NEURAL NETWORK TRAINING WITH REDUCED PRECISION

CROSS-REFERENCE TO RELATED APPLICATIONS

This application claims benefit of U.S. Provisional Patent Application Nos. 62/502,333 filed May 5, 2017, and 62/561,499 filed Sep. 21, 2017, incorporated herein by reference.

STATEMENT REGARDING FEDERALLY SPONSORED RESEARCH OR DEVELOPMENT

None.

FIELD

This technology relates to deep neural networks ("DNNs"), and to using reduced precision computing capabilities to efficiently train such networks.

BACKGROUND

In the practice of software development, programmers learn early and often the importance of using the right tool for the job. This is especially important when it comes to numerical computing, where tradeoffs between precision, accuracy and performance make it useful to choose the best representation(s) for data.

Many technical and high performance computing applications require high precision computing with 32-bit (single float, or FP32) or 64-bit (double float, or FP64) floating point representations and computations. But there are many applications for which lower precision arithmetic may suffice. For example, researchers in the rapidly growing field of deep learning have found that deep neural network architectures have a natural resilience to errors due to the back propagation algorithm used in training them, and some have argued that 16-bit floating point (half precision, or FP16) is sufficient for training such networks.

Storing data represented as FP16 (half precision) as compared to higher precision FP32 (full precision) or FP64 (double precision) reduces memory usage of a neural network, potentially allowing training and deployment of larger networks. FP16 data transfers take less time than FP32 or FP64 transfers. For many networks, certain deep learning inference can even be performed using 8-bit integer computations without significant impact on accuracy.

The combined use of different numerical precisions in a computational method or platform is known as "mixed precision." While it is possible for different phases or stages of a computation method to use different precision computation hardware, a number of platform and computing devices now offer mixed precision capability as a configuration option. For example, the NVIDIA Pascal architecture provides features aimed at providing higher performance for applications that can utilize lower precision computation, by supplementing higher precision 32-bit instructions with additional vector instructions that pack multiple lower-precision operations into the same 32-bit data path. Such instructions may operate for example at 16-bit floating point data ("half" precision or "FP16") or at 8- and 16-bit integer data (AINT8 and INT16).

Speed advantages can thus potentially be obtained by using such reduced precision capabilities. For example, the NVIDIA Tesla P100 powered by the GP100 GPU can perform FP16 arithmetic at twice the throughput of FP32. The NVIDIA Tesla P100 supports a two-way vector half-precision fused multiply-add (FMA) instruction which can issue at the same rate as 32-bit FMA instructions. For example implementation information, see for example commonly-assigned US20150169289 entitled "Logic Circuitry Configurable to Perform 32-Bit or Dual 16-Bit Floating-Point Operations", incorporated by reference. This means that half-precision arithmetic has twice the throughput of single-precision arithmetic on the P100. These instructions are valuable for implementing high-efficiency deep learning inference, as well as other applications.

Although some work applying reduced precision to machine learning and training has been done in the past, further improvements are possible and desirable.

BRIEF DESCRIPTION OF THE DRAWINGS

This patent or application file contains at least one drawing executed in color. Copies of this patent or patent application publication with color drawing(s) will be provided by the Office upon request and payment of the necessary fee.

The following detailed description of example non-limiting illustrative embodiments is to be read in conjunction with the drawings of which:

FIG. 15 is a schematic diagram of an example machine learning system.

DETAILED DESCRIPTION OF EXAMPLE NON-LIMITING IMPLEMENTATIONS

In the following description, numerous specific details are set forth to provide a more thorough understanding, but it will be apparent to one of ordinary skill in the art that the technology herein may be practiced without one or more of these specific details. Well-known features have not been described in order to avoid obscuring the disclosed non-limiting implementations.

It is advantageous to be able to perform deep neural network machine learning computations efficiently and accurately on reduced precision hardware. For example, as of the time of this filing, typical parallel processing machine learning may be performed on hardware capable of performing floating point arithmetic calculations with full (e.g., 32 bits of) precision. However, to increase efficiency and machine utilization, it may be advantageous to perform at least some aspects of deep neural network learning efficiently using a reduced precision computation capability such as half precision (i.e., floating point arithmetic with 16 bits of precision).

Reduced precision hardware does not cover as wide a range of numerical representations as full precision, but such calculations are cheaper to implement and perform in hardware. This allows more parallel arithmetic calculation pipelines on the same area of silicon, with corresponding increases in parallel processing and machine learning speed. However, when using reduced precision hardware for machine learning, certain numerical issues arise.

Simplified View of a Neuron

Figure 1:
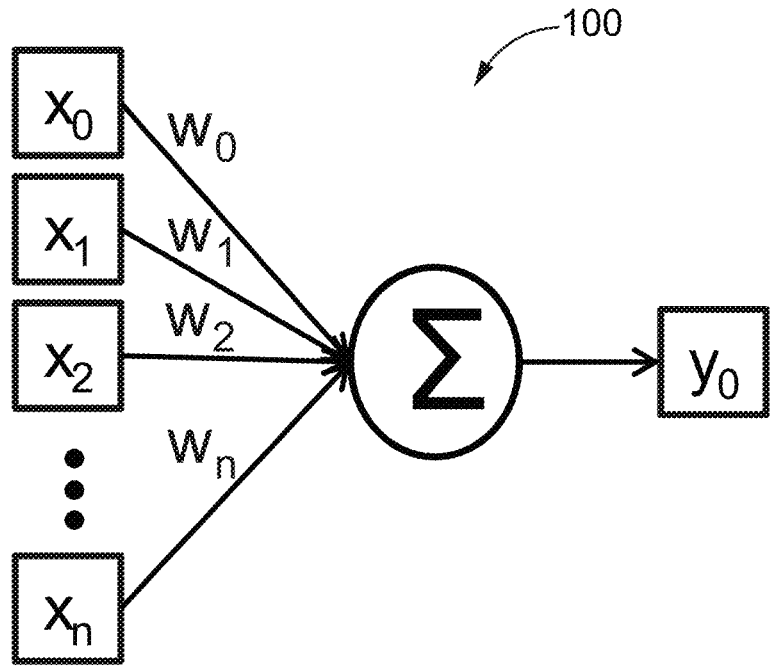
FIG. 1 is a simplified schematic view of an example neuron.

FIG. 1 shows a simplified view of a machine implementation of an artificial neuron 100 (part of a computer-implemented neural network). The FIG. 1 artificial neuron 100 multiplies input values ($x_0, x_1, x_2, \ldots, x_n$) with weights ($w_0, w_1, w_2, \ldots, w_n$), and sums the products to produce outputs ($y_0$).

The artificial neuron 100 learns values for weights ($w_0, w_1, w_2, \ldots, w_n$) through training.

Simplified View of an Example DNN

Figure 2:
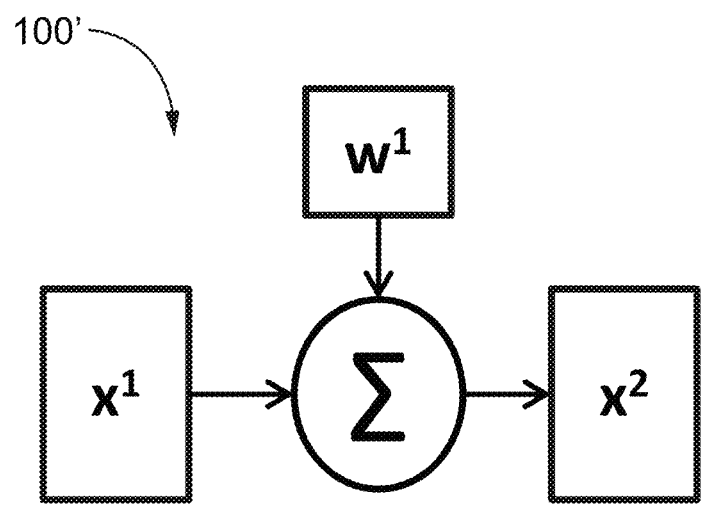
FIG. 2 is a simplified schematic view of an example neural network layer.

As FIG. 2 shows, artificial neurons 100 can be "fed forward" so the output of one artificial neuron can serve as an input to the next of a successive number m of artificial neurons where m is any non-negative integer. Such artificial neurons 100 can be organized in layers to form a neural network. There can be any number of interconnections between layer inputs and layer outputs with artificial neurons having multiple inputs or providing multiple outputs to other artificial neurons (not shown for simplicity). A deep neural network ("DNN") is a collection of m layers, feeding into each other or one into the next. Generally speaking, a deep neural network (DNN) is an artificial neural network (ANN) with multiple hidden layers of units between the input and output layers.

Figure 3:
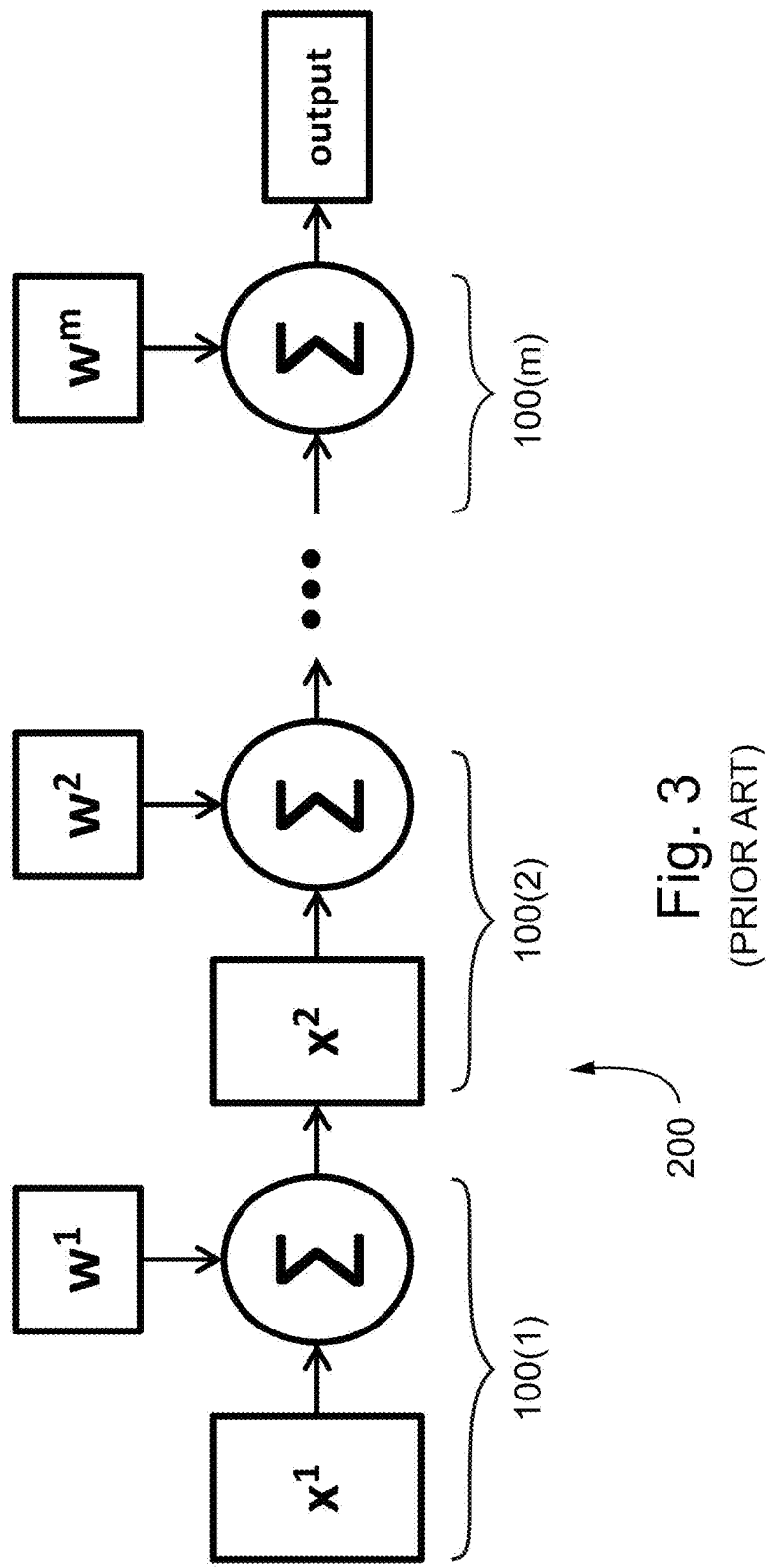
FIG. 3 shows a simplified schematic view of an example deep neural network (DNN).

FIG. 3 shows an example DNN 200 comprising m layers 100(1), 100(2), . . . 100(m). A DNN 200 of the type shown in FIG. 2 is sometimes called a deep feed forward neural network or a multilayer perceptron. These networks are called "feed forward" because information flows through the function being evaluated from $x^1$ through intermediate layers ("hidden layers") used collectively to define a function $f$, and finally to the output y.

Each layer 100 of the deep neural network 200 has its own weight(s). For example, weight $w^1$ is associated with layer 100(1), weight $w^2$ is associated with layer 100(2), and so on. The goal of training DNN 200 is to learn weights w for all layers of the DNN.

Simplified View of DNN Training

Figure 4:
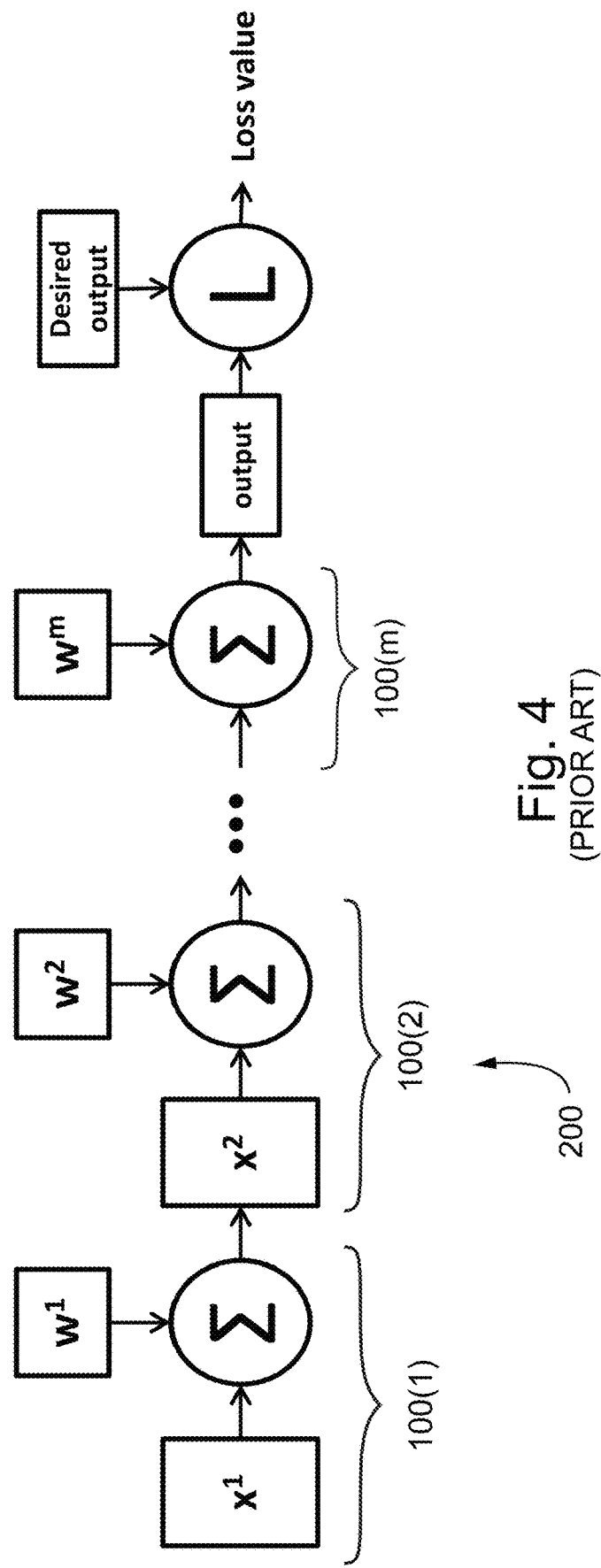
FIG. 4 shows a simplified schematic view of example DNN training using a loss value.

FIG. 4 shows an example non-limiting training in which a loss computation L 300 processes the DNN output to provide training. Loss computation 300 (sometimes called an objective function or criterion, and because it typically is minimized, is often referred to as a cost, loss or error function) compares the network 200's output to what we wanted it to produce, and assigns a numeric value to the "wrongness". The typical goal is often to find weights W that minimize the negative log likelihood (or cross entropy) i.e., that "wrongness".

To train DNN 200, training data is applied to the DNN as input. In a forward pass, the DNN 200 propagates the input through all the layers 100 to compute the output and the loss. Then, in a backward pass, the network propagates the loss backwards, computing the gradients (derivatives) for all weights w. Back-propagation thus allows the information from the loss to flow backward through the DNN 200 in order to compute the gradients.

As is well known, "gradient" generalizes the notion of derivative or partial derivative to the case where the derivative is with respect to a vector: for example, the gradient of $f$ is the vector containing all the partial derivatives, denoted $\nabla f_x(x)$ (element i of the gradient is the partial derivative of $f$ with respect to $x_i$). Note that it is typical to compute activation gradients (derivatives) before computing weight gradients (derivatives) since the activation gradients are "on the path" from loss to weights.

The training then performs a weight update that updates each weight w according to its corresponding derivative, thereby training the DNN 200.

The above is repeated with additional training data until the loss is minimized or becomes acceptably low. Depending on the application, a large number (e.g., potentially millions) of records can be used to train DNN 200. Each such record when applied as input to DNN 200 will instigate (at least) m activation gradient computations and (at least) m weight gradient computations, where m is arbitrarily large and depends on the depth of DNN 200. Training a typical deep network can thus involve many millions of gradient computations. Such gradient computations typically involve automatic differentiation using the chain rule with multiplications, sums and accumulations typically performed by hardwire-implemented arithmetic logic units. Such hardware-implemented arithmetic logic units can be supplied as part of hardware-based accelerators 1004 (see FIG. 15) capable of performing floating-point arithmetic operations.

Because of the potentially vast number of activation and weight gradient computations that may be needed to train DNN 200, it may be attractive or efficient to use reduced precision to perform those computations. For example, in some platforms such as mixed precision hardware accelerators or distributed computing architectures featuring arithmetic computation units having different computation precisions, it may be possible to perform some multiple number of half-precision (e.g., FP16) computations as compared with full-precision (e.g., FP32) computations in a given time period. As an example, certain NVIDIA Pascal based architectures can perform two FP16 computations for every FP32 computation using the same width data paths and increased efficiency of memory bandwidth utilization. Such speed and efficiency performance gains can be an attractive solution when it is desirable to reduce the amount of training time, reduce memory bandwidth requirements, increase the size of the DNN or for other reasons. In other computing platforms such as cloud-based architectures having both higher precision (but more expensive) computation hardware or capabilities and lower precision (but less expensive) computation hardware or capabilities, it may be desirable to use the cheaper or more efficient lower precision computation hardware/capabilities for parts of the learning process that require a plethora of computations, and save the more expensive higher precision computation hardware/capabilities for other parts of the learning process that require more precise computations or comparisons. There are also instances in which it is desirable to run legacy software and processes written for a higher precision computation platform on a mixed precision platform to take advantage of the efficiency and speed increases that may be gained by performing some computations using reduced precision.

A Numerical Computation Problem

Reduced precision can have two undesirable numerical computation effects when training DNN 200:

Certain values become denormal
Certain other values become zeros.

In particular, when training a known DNN 200 from scratch using reduced precision such as FP16, certain values will become denormals and certain other values become zeros as compared to full precision representation. This happens because single precision floating point has much wider representation range than half-precision floating point. Such numerical problems can prevent DNN 200 from training well or at all.

In this context, denormal or denormalized numbers (also sometimes called "subnormal" numbers) fill the underflow gap around zero in floating-point arithmetic. Arithmetic underflow can occur when the true result of a floating point operation is smaller in magnitude (that is, closer to zero) than the smallest value representable as a "normal" floating point number in the target datatype. Underflow can in part be regarded as negative overflow of the exponent of the floating point value. For example, if the exponent part can represent values from −128 to 127, then a result with a value less than −128 may cause underflow. Using half-precision FP16 as an example, denormals are any values between $2^{-25}$ and $2^{-15}$ (the smallest "normal" number FP16 can represent). Because such denormals are the last few values before underflowing, they can cause erratic behavior when certain types of operations or computations are performed on them. Such numerical problems can result in instability, failure to train and/or inefficient training of DNN 200.

Other small values become zeros because they are too small to be represented using a reduced precision representation. As an example, for FP16, any value smaller than $2^{-25}$ becomes a zero (compare the corresponding value of $2^{-127}$ for full-precision 32-bit floating point representations). These values are not truly "zero" but they are too small to represent at reduced precision. Substantial efficiency and other improvements could be obtained if there were a way to recover such "zeros" using reduced precision computation hardware.

Such numerical problems are not just theoretical—it turns out they have a very real impact when training DNN 200. For example, when training DNN 200 using single precision (FP32) floating point and looking at the histograms to determine where the values fall, it can be seen that many values fall within the denormal and zero ranges for half-precision (FP16) floating point representations and computations.

Figure 5A:
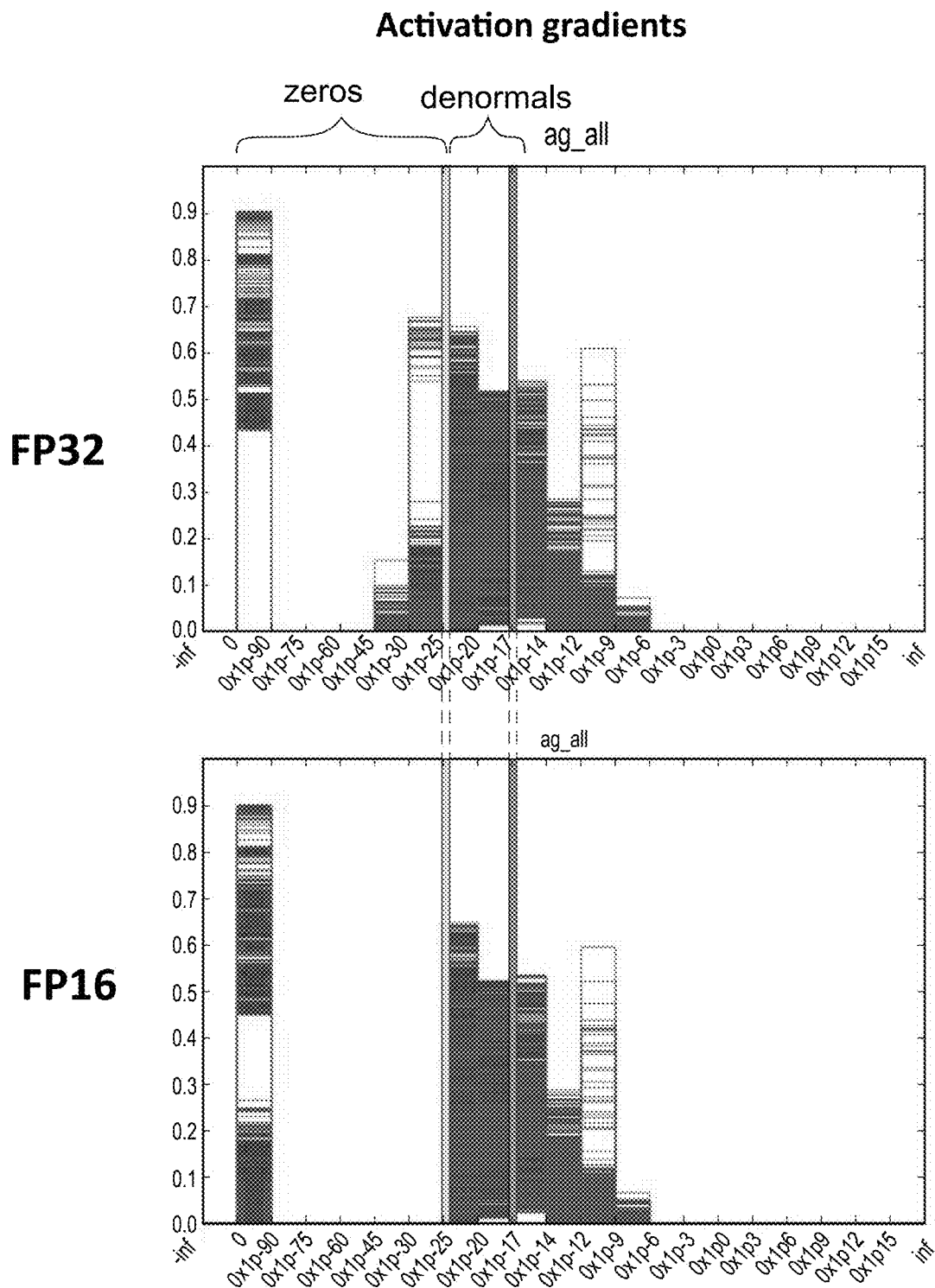
FIG. 5A shows (in color) histograms of example Resnet50 activation gradients in full and half precision.
Figure 5B:
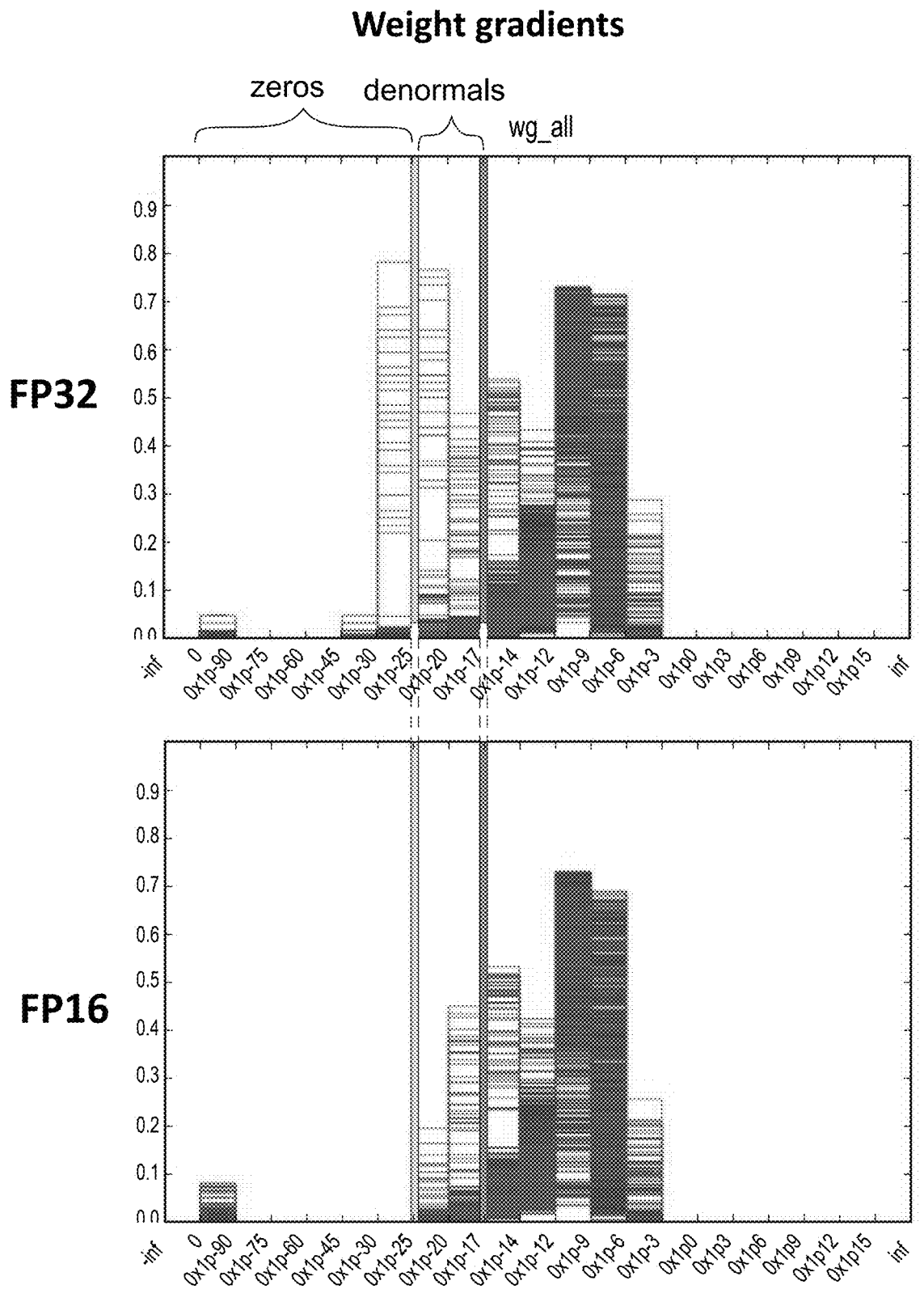
FIG. 5B shows (in color) histograms of example Resnet50 weight gradients in full and half precision.

FIGS. 5A-5B show example non-limiting histograms of Resnet50 gradients. These histograms are a graphical representation of the distribution of numerical data, and provide an estimate of the probability distribution of a continuous or quantitative variable—in this case activation and weight gradients calculated during DNN training. Resnet50 is a well-known neural network for image processing tasks. There are networks that exhibit worse behavior than shown in these example histograms.

In these FIG. 5A/5B example histograms of Resnet50 Gradients:

FP32 values to the left of the blue (rightmost vertical) line become denormals in FP16.

FP32 values to the left of the yellow (leftmost vertical) line become zeros in FP16.

As can be seen, a significant portion of both activation and weight gradients are affected. In particular, DNN training in FP32 results in a large number of such zero and denormal values:

Recovering these values helps the DNN training procedure.

There are cases where without this recovery the network does not train.

In more detail, in FIG. 5A, the upper part of the diagram shows activation gradients in full precision (e.g., FP32), whereas the lower half of the diagram shows the gradients in half-precision (e.g., FP16). The activation gradients shown in FIG. 5A are computed from the loss function, from which the weight gradients in FIG. 5B are computed. Thus, if numerical problems arise in the activation gradients, this can cause the network to not train or to not train as well.

The left-most (yellow) vertical line in the FIG. 5A diagram indicates values that cannot be represented at all in the reduced precision implementations (i.e., values discussed above as being "zeros"), whereas the values in the band between the two (yellow and blue) vertical lines are denormals. As can be seen in these non-limiting examples, there are many values to the left of the right-hand (blue) vertical line. A significant portion of the activation gradient values are thus affected by the numerical issues of denormals and zeros in this non-limiting example. As the lower histogram in FIG. 5A shows, a significant number of values to the left of the left-hand (yellow) vertical line which will be zeroed out if reduced precision (FP16) is used. Note that the column to the extreme left in these diagrams indicates the number of zeros.

The weight gradients in FIG. 5B have fewer problems, but there are still a significant number of denormals and a significant number of zeros that will result in zero values or instability at half precision.

Shifting/Recovering Numerical Representations to Avoid Numerical Problems

The example non-limiting technology herein desirably loses as few values to zeros as possible and shifts values from the denormal range into a normal range to provide better arithmetic properties for computing.

One example non-limiting solution to solving this problem adjusts the gradient values during reduced precision training to provide advantages of reduced precision training (e.g., speed, power, cost, etc.) without suffering the disadvantages of the numerical problems discussed above.

In one example non-limiting implementation, the gradient computation operates on larger values. In this example non-limiting arrangement, denormals become normalized and some of the values that would otherwise be lost to zeros are recovered.

In some example non-limiting implementations, several or many processes (e.g., weight decay) are affected by computed values of the weight gradients. It is desirable in such contexts to not affect those processes that use and/or test the weight gradients. Once we have used scaling to improve the numerical properties of the gradient computations during back propagation, it is desirable in many contexts to undo the scaling effects before further processes occur. In one example non-limiting implementation, the only reason for such loss value scaling is to improve the numerical properties during the gradient computations. In such applications, it is desirable to isolate the effect of the loss value scaling so it is limited to just the gradient computation and does not affect any other part of the learning or training process.

While reduced precision computations can also be used in other parts (e.g., inferencing, forward pass, etc.) of the training and learning process, the particular scaling applied to a particular backpropagation iteration to compute partial derivatives (gradients) is compensated for or undone in certain non-limiting implementations after performing the gradient computations because the benefits of scaling in providing better numerical computation characteristics for computing gradients on back propagation have already been obtained and allowing the resulting magnitudes of the computed gradients to remain scaled could have unintended effects.

It is thus desirable in some applications to not affect the rest of the training procedure. For example, it is desirable that the rest of the network layer code and training is unaware of and unaffected by scaling adjustments being made for reduced precision training gradient computation. By compensating for such adjustments before other processes use the computation results, there is no need to make further network-based changes to adjust for reduced precision gradient computations.

Thus, it would be desirable to shift the magnitudes of the gradient numerical values in FIGS. 5A, 5B histograms to the right but in a way that does not impact network training. Since the network gradients are used to update network weights, it is desirable in many DNN training applications to compensate for the range adjustments made for reduced precision gradient computation so that the weights or weight-based computations performed after the gradient computations are not affected. Such compensation prevents weight adjustment results from becoming larger even though the gradient values have been scaled upward for purposes of gradient computation using reduced precision computation hardware.

Example Non-Limiting Architecture with Scaling and Compensation

Figure 6:
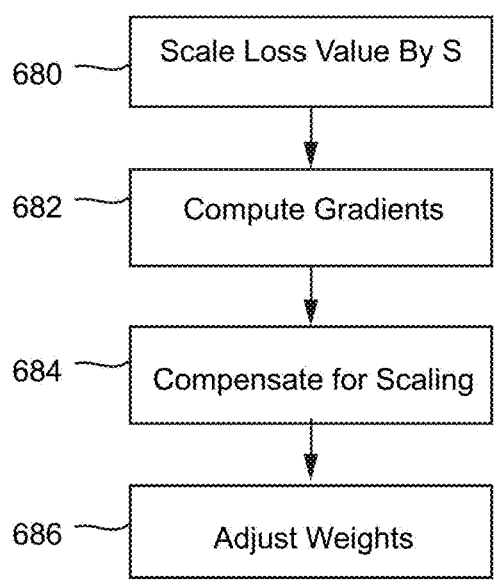
FIG. 6 is a simplified flow chart of an example non-limiting implementation using reduced precision, scaling and scaling compensation.
Figure 6A:
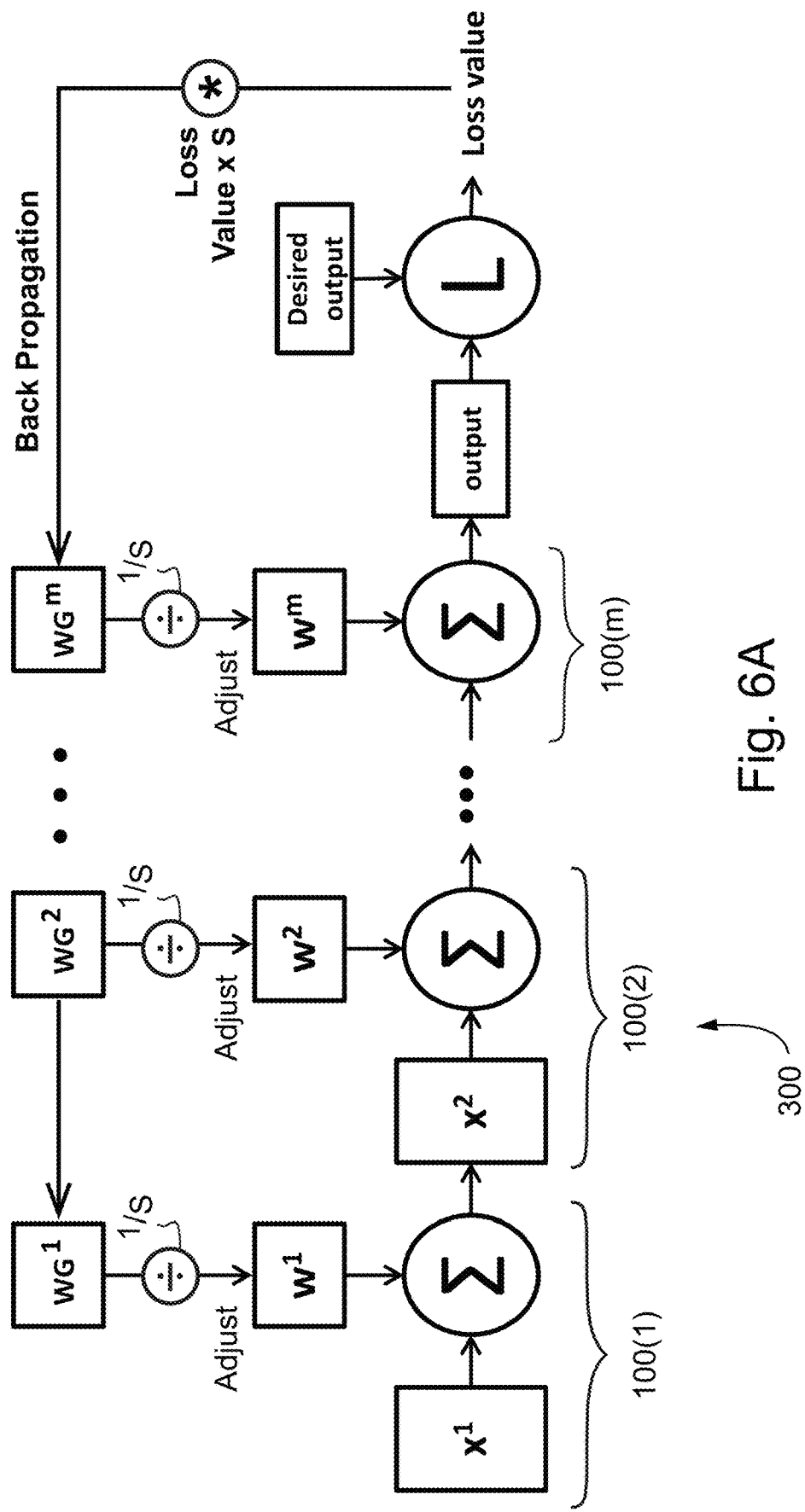
FIG. 6A is a simplified schematic view of an example non-limiting implementation using reduced precision, scaling and scaling compensation.

In one example non-limiting implementation, as part of the forward pass of training DNN 200, the system scales the loss value by some factor S (see FIG. 6 block 680 and FIG. 6A). This results in scaling of the gradient computations on the backward pass (FIG. 6 block 682; FIG. 6A WG$^1$ . . . WG$^m$). Meanwhile, the weight update process (FIG. 6 block 686) is compensated for the scaling (FIG. 6 block 684; FIG. 6A division blocks and "Adjust") prevent the gradient scaling from impacting the weight computations. In one example non-limiting implementation, the weight update effectively or actually reduces (divides) the weight gradient contribution S to reverse the effect of scaling after the numerical gradient computations are complete (see FIG. 6A).

Example Features and Advantages

Example non-limiting implementations herein thus adjust the gradient values so that during reduced precision training the following are satisfied:

Gradient computation operates on larger values:
    Denormals become normalized
    Some of the values lost to zeros are recovered
The rest of the training procedure is not affected
    Specifically, weight updates, learning rates updates, etc., are unaffected
Software written for various DNN layers is not affected
Other features include:
Modification of the training method so that:
    forward pass scales the loss value by some factor S
    weight update reduces the weight gradient contribution 1/S
Various methods for:
    selecting the scaling factor S
    adjusting the weight update
Example Methods for Selecting the Scaling Factor S
Constant selected by user as another hyperparameter (see FIGS. 9, 11)
Automatically-select the factor for each iteration (see FIG. 10)
    Find the weight gradient with the largest magnitude, x
    Compute upper bound on the factor: $\mu = \log_2(2^{15} - x)$
    $S = \mu - k$
        k is a small constant (say, in 2 . . . 5 range), to prevent overflow
Automatic back-off (see FIG. 12):
In each iteration start with a large value for S
Compute the forward and backward passes
Check for Inf(inite) or NaN (Not a Number) values in weight gradients, if any are found:
    Do not update the weights, reduce S, repeat the iteration
A number of schemes can be proposed for picking the starting S, as well as for ways to reduce/increase S as required during training
Example Non-Limiting Methods for Adjusting Weight Update
    Adjust the weight gradients
        Before the weight update, modify each weight gradient value by 1/S (see FIG. 13A)
    Do not adjust the weight gradients, instead adjust other parameters (or in some cases adjust both weight gradients and other parameters) to compensate for scaled gradient computations (see FIGS. 13B-13D)
        Parameters can include:
            Learning rate, gradient clipping threshold, weight decay parameter, etc.
        The potential benefit of adjusting parameters other than the computed weight gradients is that often fewer values are being modified
            O(10) parameter values versus potentially up to O($10^7$) weight values
Example Non-Limiting Implementations Referring to FIG. 6A, the loss value in one example non-limiting implementation is multiplied by the value S as part of the forward pass. Because the FIG. 6A additional computation for the loss value on the right-hand side scales the loss value upward by value S, all of the gradients e.g., WG$^1$ . . . WG$^m$ calculated by each one of the computation boxes is also scaled upward by S. This is because the computed loss value back-propagates through the network on the backward path to calculate activation and weight gradients. Thus, in this particular implementation, merely by scaling the loss value, it is possible to scale all of the intermediate gradient calculations on the backward path. Because each one of these various computations has been scaled upward, the zero and denormal problems discussed above are largely avoided using an efficient modification. Because the gradient computations operate on larger values, denormals become normalized values, and values that we would otherwise lose to zeros become recovered.

Then, before updating the network weights $W^1 \ldots W^m$ based on the result of the gradient computations, the weight gradient contributions $WG^1 \ldots WG^m$ are altered in recomputing the weights or otherwise compensating for the scaling to prevent the upward gradient scaling from impacting the weight computations or otherwise affecting the rest of the training procedure. Such compensation prevents the network weight update process from for example clipping the gradients (to avoid an exploding gradient problem) and allows the training results to proceed without the rest of the training procedure being aware that the gradient computations were performed at reduced precision based on scaled-up values.

Figure 7:
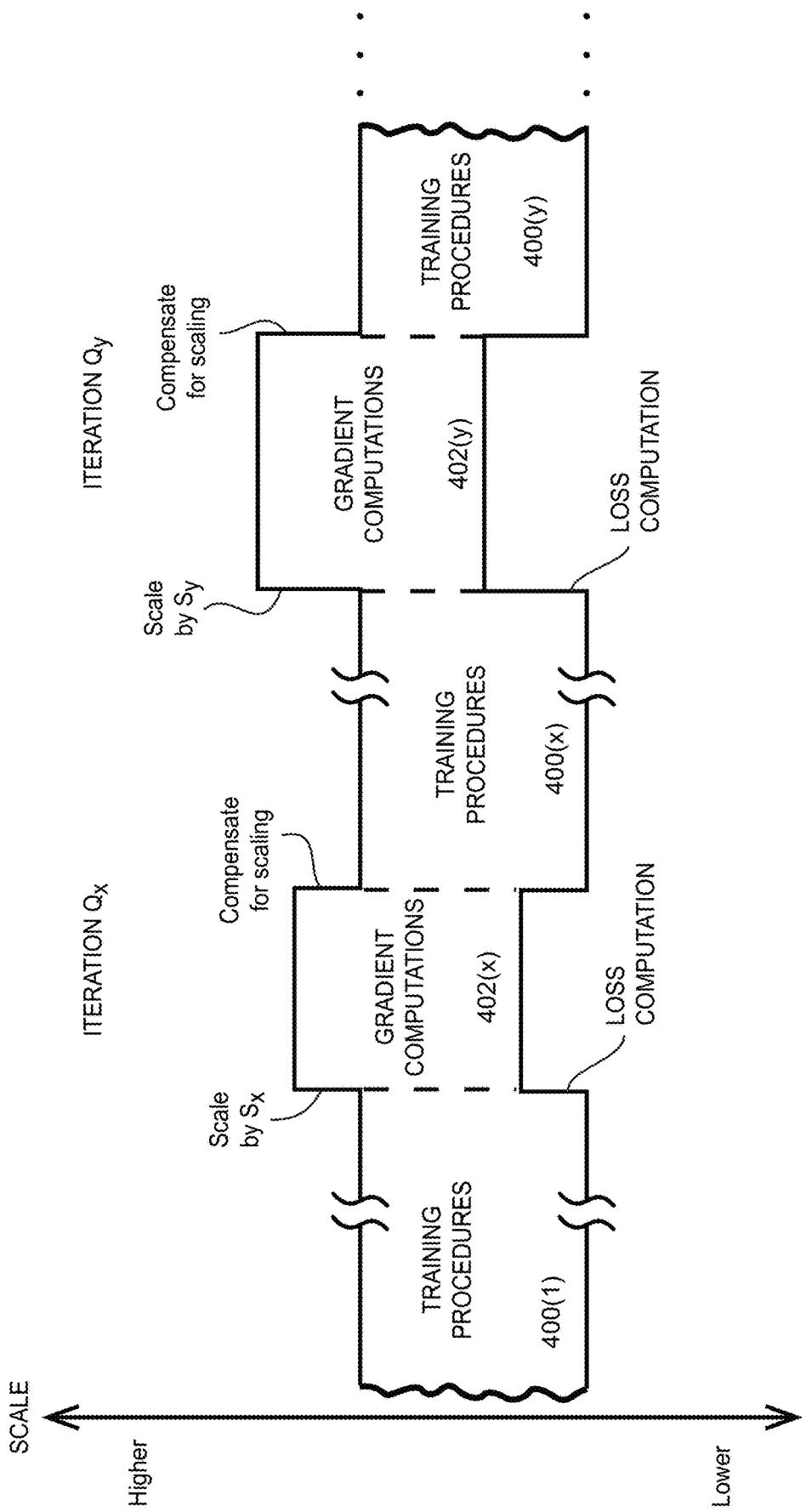
FIG. 7 is a flow diagram showing example scaling and scaling compensation for gradient computation in multiple iterations.

FIG. 7 shows an example non-limiting graphical flow view of this process for two different training iterations $Q_X$ and $Q_Y$. Training procedures 400(1) heading into and as part of iteration $Q_X$ may be performed using higher precision if desired. Before back propagation to compute gradients (402 (x)), the loss value resulting from forward propagation is scaled by $S_x$ and the gradient computations are performed at lower precision. After the gradient computations are completed, they are compensated for the scaling and the compensated values are used for additional training procedures (which may for example comprise weight adjustments at higher precision) (400(x)). Similar processes can be repeated for training iteration $Q_Y$—potentially with a different scale factor $S_y$. (402(y), 400(y)).

Figure 8:
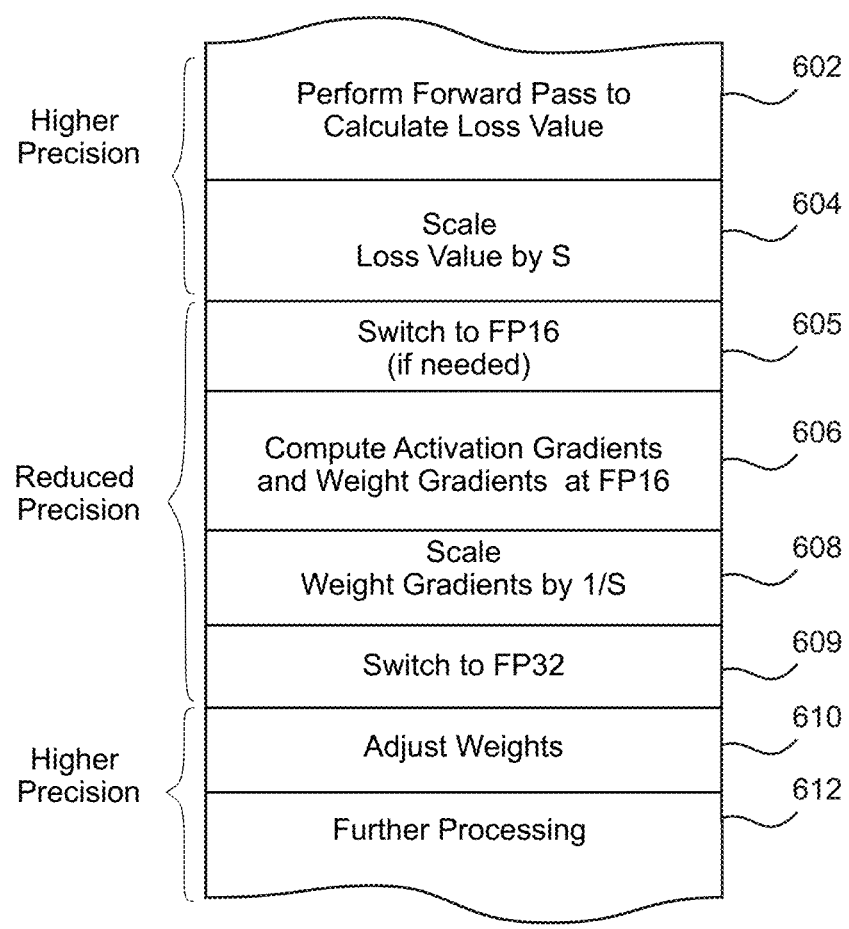
FIG. 8 is a schematic diagram of example non-limiting software structure.

FIG. 8 shows an example non-limiting code fragment executed by a training system to perform the above. The platform may perform a forward pass based on training data to calculate a loss value at higher precision (e.g., FP32) (602) and then executes an instruction(s) 604 to scale the loss value by S. The code may then (if not already in reduced precision computation mode for the forward pass) instruct the training system to use lower precision computations (e.g., by switching mixed precision hardware to a reduced precision mode such as FP16 or by scheduling computation tasks to be performed by reduced precision hardware) (605). The reduced precision computation capabilities then perform back propagation on network 200 to compute activation and weight gradients at reduced precision (606). The platform then scales the weight gradients by 1/S or otherwise compensates the computed weight gradients (or further processes that use them) for the scaling (608), and switches to higher precision (if necessary) to perform the weight adjustment (610) before performing further processing in higher or lower precision (612).

The example non-limiting technology herein can be used with any reduced precision implementations including for example fixed point computation hardware. Some fixed point implementations comprise dynamic fixed point comprising a fixed point computation plus another dynamic component. In such implementations, the scaling can be performed by modifying the dynamic component. In such implementations, each computation involves a dynamic scaling factor, so such scaling factor can be changed dynamically for each iteration as needed to accommodate the scaling discussed herein. Scaling factors may already be used in such systems, but the implementation herein could increase the scaling factor to correct for the reduced precision as discussed above. The technology herein can thus apply to any reduced precision approach.

There are various ways to isolate the rest of the learning process from the scaling to prevent the upward scaling of the gradient computations from impacting the weight computation or other subsequent processing. There are also various methods for selecting scaling factor S and for adjusting the weight update.

Example Methods for Selecting Scaling Factor S

One example way to select the scaling factor S is to have a user select a constant that is inputted into the machine learning as a hyperparameter. In such an approach, the user can input an S value and determine the result. If the result is not acceptable or optimal, then the user could input a different S hyperparameter and try the iteration again.

Figure 9:
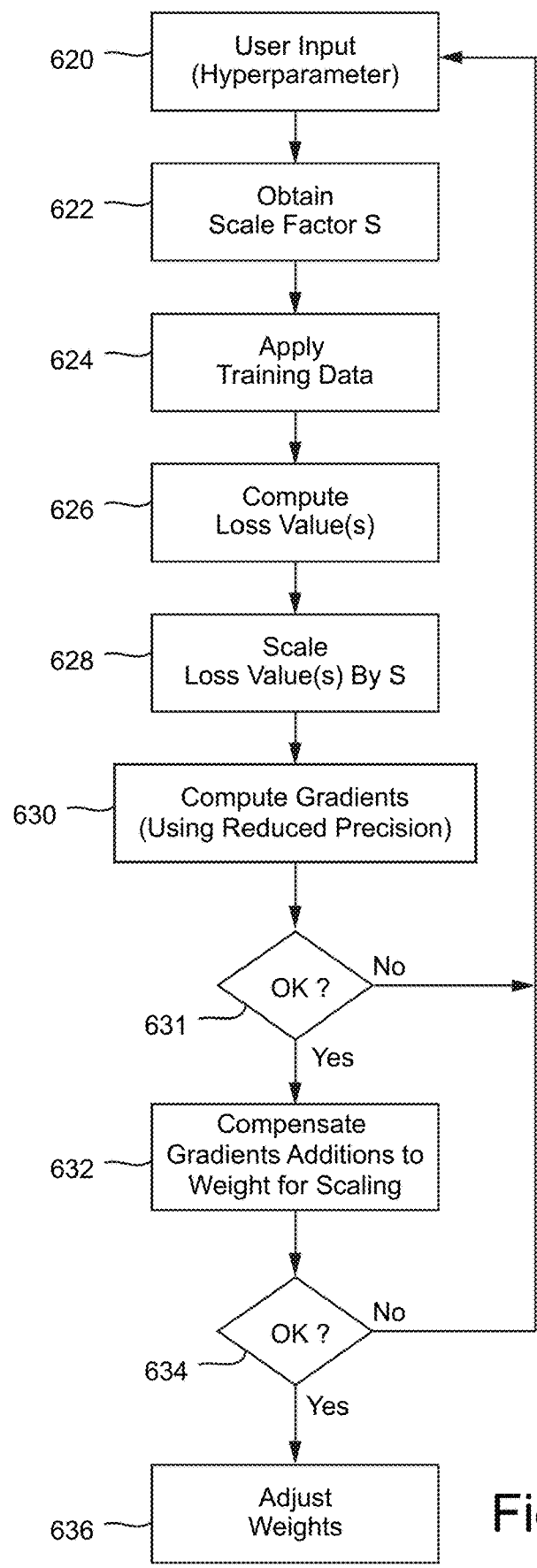
FIG. 9 is a schematic flowchart of example non-limiting training procedures using a user-specified (hyperparameter-assigned) scaling factor S.
Figure 11:
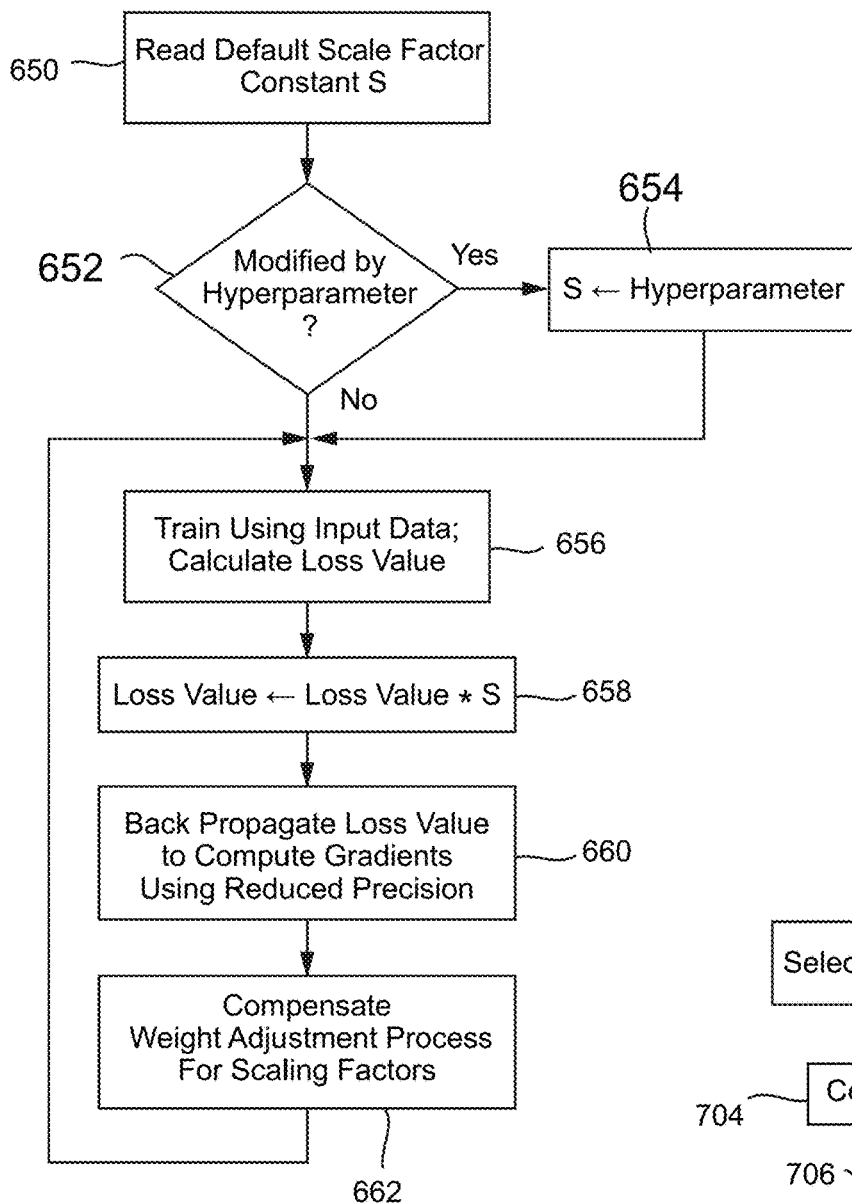
FIG. 11 is a schematic flowchart of example non-limiting training procedures using a default but modifiable scaling factor S.

FIGS. 9 and 11 show example such approaches. The user can provide input by inputting a hyperparameter (block 620). The system obtains the scale factor S from the hyperparameter (block 622). Or as shown in FIG. 11, the system can read a default S which a user can optionally modify with a hyperparameter (650, 652, 654). The system then applies the training data to the network 200 (624) and performs a forward propagation through the network to compute a loss value(s) (blocks 626, 656). The system scales the loss value(s) by S (blocks 628, 658) and uses the scaled loss value in a back propagation to compute gradients using reduced precision computations (blocks 630, 660). If the results are okay (decision block 631), the computed gradient additions to network weights are compensated (block 632) and (assuming no further problems as tested by decision block 634) the network weights are adjusted and stored (block 636). If problems occur ("No" exit to decision blocks 631, 634), the user may be asked to input a different scaling factor S via a hyperparameter (block 620) and the process repeats.

In some example implementations, the system can automatically select the scaling S factor for each iteration. Ideally, we should scale by the largest value we can but without overflowing. As discussed above, the largest value that a floating point 16 representation can represent is based on the number $2^{15}$. This means a value as high as 65,535 can be represented ($2^{16}$=65,536). Scaling upward too much can cause higher values than this, resulting in pushing values into a representation of infinity To avoid this, it is possible to compute an upper bound on the scaling factor S.

Figure 10:
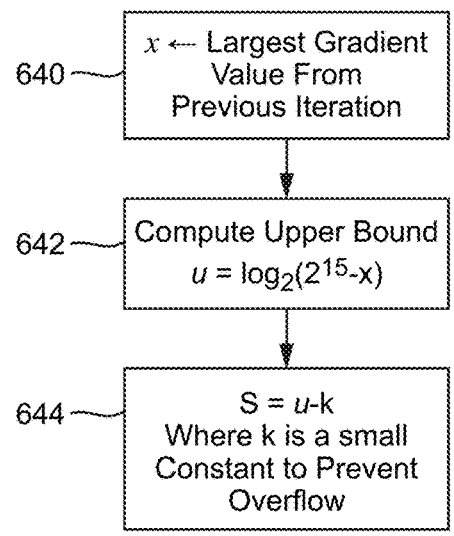
FIG. 10 is a schematic flowchart of example non-limiting training procedures using automatic selection of a scaling factor S.

In one example, this upper bound is: $\mu=\log_2(2^{15}-x)$ where x is the magnitude of the largest gradient value seen in the previous iteration (FIG. 10, block 640, 642). In this non-limiting implementation, for each back propagation the system performs, it examines all of the weight gradients at that point and from that determines the scaling factor S for the next iteration as S=µ−k where k is a constant (block 644). With such examination, it is straightforward to determine the largest computed gradient values. An additional backoff constant k can be applied to provide additional protection against overflow.

Referring back to FIGS. 5A, 5B, from observations one can see that the weight gradients tend to have the larger values. In the particular example shown, the largest activation gradient value is 1/64—that is, 0×1p−6, i.e., $2^{-6}$— whereas the largest weight gradient is 1/8—that is, 0×1p−3, i.e. $2^{-3}$. Because weight gradients tend to have larger values than activation gradients, weight gradients typically cannot be shifted as far to the right as activation gradients. On the other hand, one can see from these diagrams that there is a substantial amount of range on the upper part of the graphs into which gradient values can be shifted and still avoid overflow.

Different networks can exhibit different behavior, and different iterations of the same network can exhibit different characteristic behaviors. The FIG. 5A, 5B histogram diagrams indicate by color (red or blue) that some of the values (red) occur later in the training period whereas other values (blue) occur earlier in the training period. But in general, we can assume that weight gradients tend to have larger values than activation gradients. Since we want to scale both activation and weight gradient computations but weight gradients will likely tend to overflow first, we therefore in one example implementation determine the scale overflow from the weight gradients and apply the same scaling factor to both activation and weight gradient computations. It is typically necessary to eventually examine all of the weight gradients in any event to update the weights, so examining the weight gradient values is not inefficient.

Thus, as discussed above, in one example non-limiting algorithm, the system determines the largest weight gradient computed to determine a scaling limit (FIG. 10 block 640). As discussed above, it is possible to also choose to back-off of the scaling limit to be conservative, in order to compute S for the next iteration. In this instance, k is a small constant (e.g., in the 2 . . . 5 range; for example scale by $2^{13}$ even though the u computation indicated it may be possible to scale by as much as $2^{18}$), to prevent overflow and provide a margin of error. Such an algorithm can be used to determine the scaling factor automatically. The automatic computation thus provides a maximum benefit without the user needing to intervene or otherwise determine the value of S for the next iteration.

Example Non-Limiting Automatic Back-Off Approach

Figure 12:
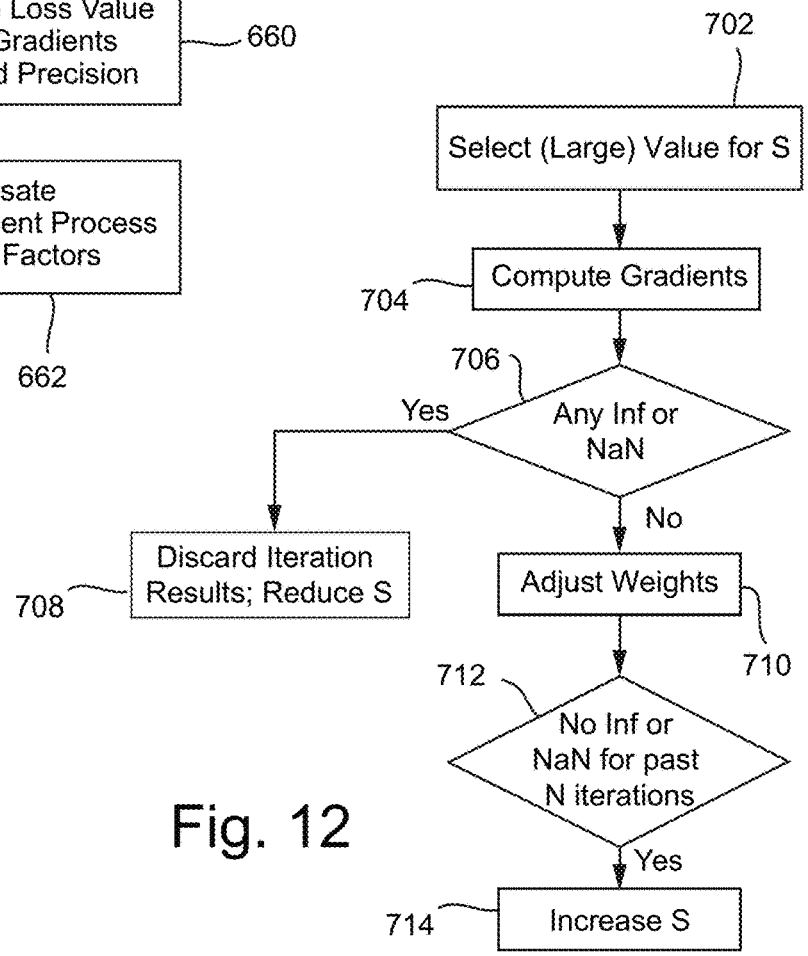
FIG. 12 is a schematic flowchart of example non-limiting training procedures using scaling result testing.
Figure 13A:
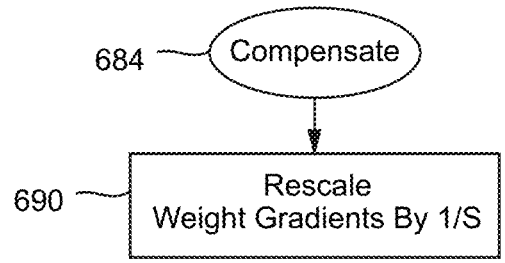
FIGS. 13A-13D show example different gradient scaling compensation techniques.

Another approach for selecting the scaling factor S uses automatic back-off. In this case (an example of which is shown in FIG. 12), for each iteration, S is set to a large value (block 670). The training system then computes the forward and backward passes including the gradients (block 672) and tests the results to determine whether S was too large (block 674). Specifically, if the S used is too large, there can be overflows and resulting infinity values. After the forward and backward passes for the iteration are computed, the resulting gradient values are checked to determine whether any weight gradients had infinite or NaN (not a number) values (block 674). If any INF or NaN values are found ("No" exit to decision block 674), the system does not update the weights, but instead reduces S and repeats the iteration (block 676).

This example non-limiting approach does not know at the beginning of the iteration what the appropriate value of S should be, so it guesses at or otherwise sets a relatively large starting value for S and then performs the iteration and tests the results to determine whether there was an infinite or not a number value in the weight gradients. The algorithm inspects the values of the weight gradients after the iteration is performed to determine whether such unacceptable results occurred. If such values are found to have occurred, the example non-limiting system infers that the scaling factor was too high, discards the results of the particular iteration, does not perform the weight update and repeats the iteration with a lower value of S. This process can occur iteratively with a succession of back-off values of S until no problem is observed, in which case the results of the successful iteration are used to update the weights. This automated trial-and-error approach can be used to relatively rapidly determine an optimally or at least reasonably large value for S for a particular iteration. The automatic back-off process is then performed again with a new high starting value for S for the next iteration to arrive at a similarly optimally large value for S for that iteration affected iterations can thus use different scaling values S.

It is possible to combine the automatic back-off technique with another technique such as automatically selecting the factor for each iteration (i.e., FIGS. 10 and 12 could be combined). A potential weakness of automatically selecting the factor for each iteration based on the computed upper bound for the last iteration as in FIG. 10 is that the last iteration may not be representative of the next iteration. The automatic back-off process of FIG. 12 can be added to provide a check and potentially a back-off and scaling factor reduction before the computed weight gradients are committed to be used to upgrade the weights.

The amount of back-off of S in FIG. 12 block 676 can be adjusted depending upon the application. Thus, a number of schemes can be used for picking the starting S as well as for ways to reduce/increase S as required during training. As an example, if the automatic back-off technique is used in combination with automatically selecting the scale factor S for the next iteration based on the results from the previous iteration, there may be enough assurance that the automatic selection will be successful that the amount of back-off of the S value can be relatively small.

Example Non-Limiting Methods for Adjusting Weight Update

As discussed above, it may be desirable in the example non-limiting implementations to "undo" the scaling factor after the weight gradients have been computed so they do not impact the weight updates. In many example implementations, it is desirable to completely reverse the scaling performed at the beginning of the iteration before the weight update to prevent errors from compounding from multiple iterations. It is possible to perform this reversal on the weight gradients themselves, or on the weight gradients as they have or after they have been combined with other things. In such non-limiting implementations, it is desirable for the scaling to be completely undone.

As an example, if S=1000, then the weight gradients will be one thousand times larger than they would have otherwise have been and using such weight gradients to update the weights will result in the weight update that is one thousand times larger than it should be. It is useful to address this in order to prevent the neural training from failing or becoming inaccurate. Additionally, since the neural network training is iterative, inaccuracies at an earlier iteration have the capacity to affect all succeeding iterations, and systematically introduced errors may be compounded.

Because weight gradients have the potential of affecting a number of different things that can vary from neural network framework to framework, the particular way to compensate for the scaling of the weight gradient may need to be selected based on the particular framework. In one example non-limiting implementation shown in FIG. 13A, before the weight update for each iteration, the system can modify each weight gradient to reduce it by multiplying it by 1/S (block 690). Since the beginning of the process multiplied the loss factor by S to increase the weight gradients by a factor of S, a way to undo this transformation is to modify each resulting computed weight gradient value by 1/S before it is used for weight update or any other purpose. To perform this modification, the system examines and re-computes each weight gradient before it is applied in the weight update process.

A conservative technique is to reverse the scaling of each weight gradient by 1/S immediately after the weight gradients are computed and before they are used by any other process. This approach requires a division for each computed weight gradient, and a large number of divisions may be required depending on the depth of network 200. Thus, one approach is to perform forward propagation, scale, do backward propagation, rescale the gradients and then proceed with the normal algorithm that is unaffected by the scaling as discussed in FIG. 6 above.

In other example non-limiting implementations, the particular approach used to adjust the weight update can be the algebraic equivalent of modifying each weight gradient value by 1/S. For example, if the particular neural network framework or a system implemented using a framework performs a multiplication of (weight gradients*learning rate), reducing the weight gradient value by 1/S is algebraically equivalent to reducing the learning rate value by 1/S before combining with the current weight. As an analogy, this approach is like a dance floor in which the caller tells the dancers to take steps to the left or to the right. Additional parameters, processes and computations that are applied/performed after the weight gradients are computed and before the weights are updated (or as part of the weight update) is like taking three steps to the right on a dance floor. If the proposed weight gradient modification to undue the scaling is like taking one step to the left, then combining the weight grade modification with a modified version of an additional process or computation (that is to be performed irrespective of scaling) that operates on the weight gradients could result in a minimal overall operation of taking only two steps to the right. This could be more efficient than requiring everyone on the dance floor to take one step to the left followed by three steps to the right.

Thus, in some non-limiting examples, it may be possible to compensate for the previous scaling while performing fewer computations. For example, in a particular framework it may be more efficient to adjust another parameter such as learning rate, gradient clipping threshold, weight decay parameter, or other parameter to reduce the number of values that are being modified. The number of such other parameters is typically smaller than the number of weight gradients. In particular, the number of other parameters may be in the order of 10 whereas the number of weight gradient values may be on the order of a million ($10^7$) for some DNN training contexts.

Figure 13B:
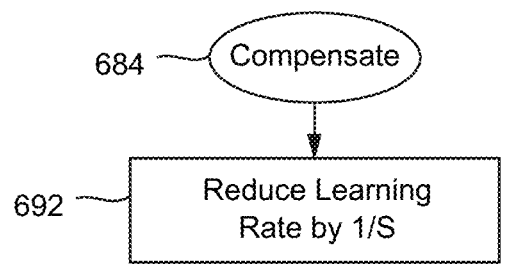
Figure 13C:
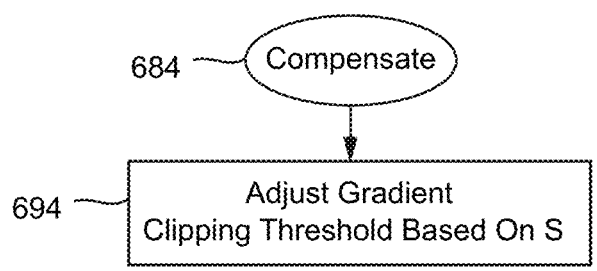

For example, in some cases, it may be possible to reduce the learning rate by the same amount (1/S), and this will have the same affect overall algebraically since weight gradients are multiplied by learning rate during weight update (see FIG. 13B block 692). This may vary from neural network training framework to framework. For example, some neural network learning frameworks have a learning rate for each weight gradient, in which case there may be no advantage to adjusting the learning rates instead of the weight gradients.

In addition to learning rate, other factors that are affected by the weight gradient may include gradient clipping threshold (FIG. 13C block 694), weight decay parameter (FIG. 13D block 696), and others.

Figure 13D:
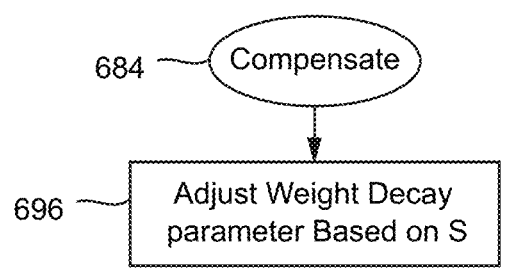

Sometimes, weight decay as shown in FIG. 13D is applied to the loss added to the loss function itself because this may avoid the network learning weights that are too big that can result in overfit. Thus, some neural network frameworks and/or learning algorithms punish the weights through the weight decay parameter in order to prevent the weights from getting too large. If there are many weights that are allowed to vary in value widely, this results in a complex function that is difficult to analyze to determine what may be wrong. Increasing the weight decay parameter has the effect of dumbing down the training to avoid overfit errors. This adapts the network to work well on the data it has seen while still allowing it to work well on data that it has not yet seen. In this example, the forward propagation, the backward propagation, and the weight updates occur with the appropriate parameter(s) and/or the weight gradients being modified or adjusted to compensate for the S scaling that was performed on the loss factor before the gradients were calculated for the iteration.

In other implementations, it may not strictly necessary to completely "undo" the results of the scaling, but instead may be sufficient to compensate for the scaling without completely reversing it. Thus, it is possible to affect other parameters and/or the process by which the weight gradient values are used for a weight update in order to compensate for the scaling that was performed at the beginning of the iteration. In a simple explanation, at the end of the iteration we have some weight gradients and these weight gradients are equal to their intended computed values plus some modification due to the scaling. It is possible to compensate for the scaling factor in a variety of different ways to prevent the scaling factor from undesirably affecting the weight update the weight gradient is used to perform. A modification at the end before the weight update, generally speaking, compensates mostly or entirely for the scaling applied earlier in the iteration. The compensation does not need to be perfect but in most applications it will largely if not completely compensate for the earlier scaling. For example, undoing 20% of the modification due to the earlier scaling will in most applications not be sufficient, but in many applications it may be sufficient to undo 90% of the scaling—especially if hyperparameter adjustment is also used in combination. The more perfect the compensation, the more invisible the scaling will be to other training functions, algorithms, parameters and other parts of the training process.

Example Non-Limiting Detailed Implementations

Many different implementations of the above are possible. In some implementations, the neural network learning code may remain the same and only the input hyperparameters are changed. In other implementations, some code changes are helpful. For example, in some contexts, when reduced precision mode is enabled, this will automatically enable the scaling of the loss (only a few lines of code), which is typically the modification of a single scalar value produced to indicate the loss value (see FIG. 6A). The backward pass then is performed using reduced precision. This approach thus minimizes the number of changes that the implementation requires. Right before the weight update occurs, additional code may test whether the scaling factor was modified and if so, performs the compensation (see FIG. 6A). Such additional code can also compute the scale factor for the next iteration.

A larger modification to the code can be used to implement dynamic scaling procedure shown in FIG. 12. After starting with some scaling factor S (702), the S value is evaluated in each training iteration by examining the gradient values (704, 706). If an overflow or NaN is detected ("yes" exit to decision block 706) then weight update (710) is skipped and S is reduced (708). Conversely, if no overflow or NaN is detected for some number of iterations ("no" exit to decision block 706), S is increased (714). An alternative approach is to adjust the scaling factor S by examining the gradient value statistics and computing their distribution—S is selected to ensure that probability of overflowing in any iteration is under a chosen threshold.

In a more basic non-limiting implementation shown in FIG. 11, the system could pick a constant for scaling (block 650) and give the user a way to modify the constant by changing a hyperparameter (blocks 652, 654) while providing a default value. This same value would then be used to scale every iteration (blocks 656-662). The implementation may further include functionally that multiplies each computed weight gradient by the inverse of the scaling factor to undo the scaling that was performed previously based upon the default (or user-modified) scaling factor constant (block 662). The scaling factor may be stated as a separate hyperparameter, or it might involve modification of an existing hyperparameter. For example, if the algorithm does not use gradient clipping, then it may be possible to modify any number hyperparameters including for example learning rate, and loss weighting. Different frameworks can have different hyperparameters for different loss values.

In other example non-limiting implementations, no code changes at all are needed and scaling and scaling compensation is accomplished by modifying hyperparameters only (FIG. 9 block 620). Depending upon the type of machine learning and the particular framework, hyperparameter modification could be all that is required—with the compensation of block 632 being performed based on an additional hyperparameter that the user inputs to define for example learning rate (the user modifying the learning rate hyperparameter before inputting it to account for the scaling factor S).

Example Non-Limiting Computing Platforms

Figure 14:
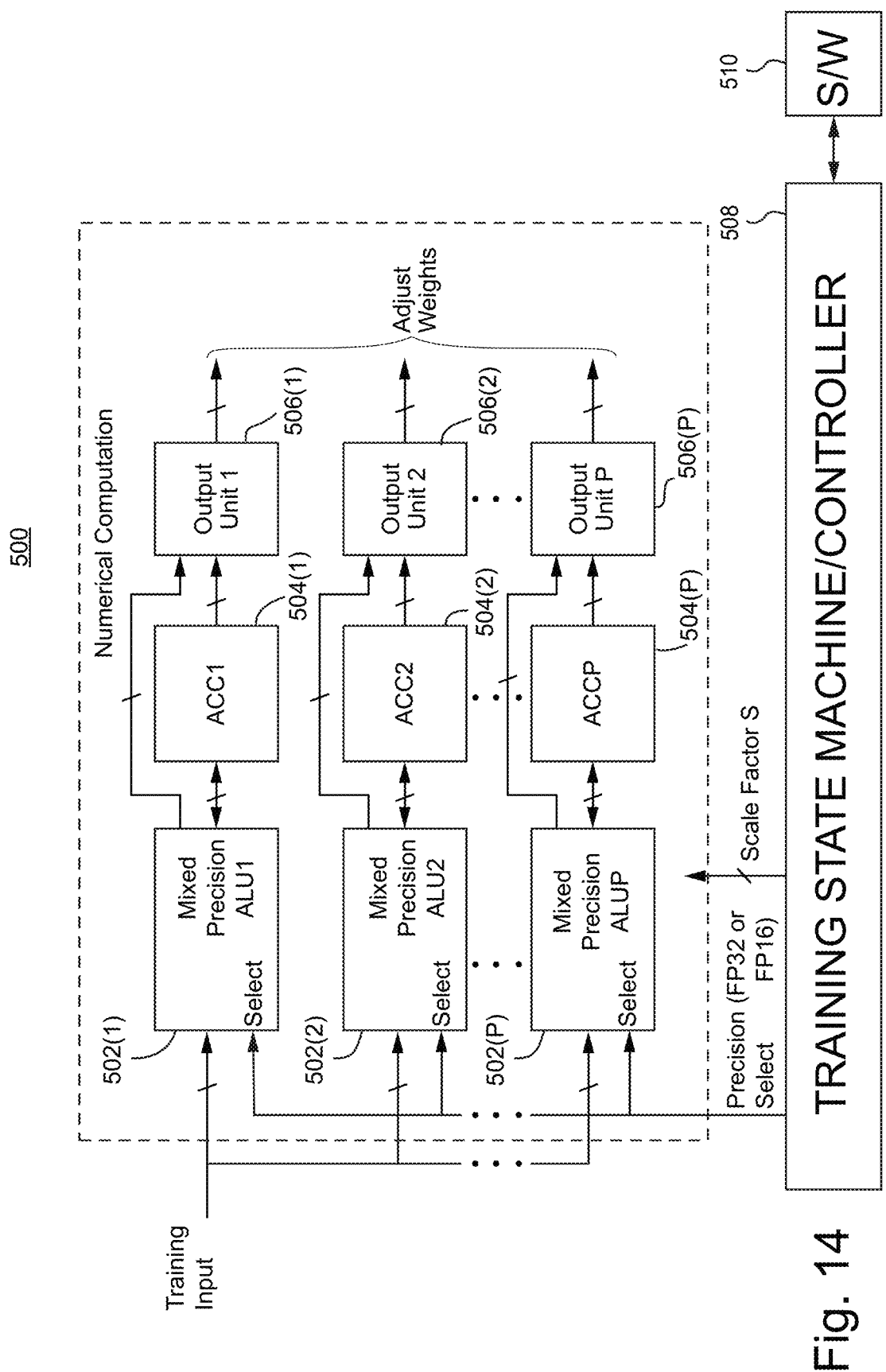
FIG. 14 is a schematic diagram of an example machine learning mixed precision computation architecture.

FIGS. 14 and 15 show high level conceptual schematic diagrams of an example platform for performing the training procedures described above. FIG. 15 shows a platform 1000 including accelerator(s) 1004 and associated memory(ies) 1006, CPU(s) 1008 and associated memory(ies) 1006', additional memory(ies) 1010, input device(s) 1012, secondary storage(s) 1014, output device(s) 1016, and other components. Such components can be co-located, distributed or both, and may communicate with one another via a local bus and/or network(s) 1002. In one implementation, the platform 1000 can provide a large number of parallel-processing accelerators (which may comprise Graphics Processing Units (GPUs) in some implementations) 1004 each controlled by one or more central processing units (CPU(s)) 1008 executing software instructions stored in memory(ies) 1006', 1010, 1014 and/or provided over the bus or network(s) 1002. The NVIDIA Pascal architecture is especially suited for such an arrangement.

In example non-limiting implementations, accelerator(s) 1004 each include numerical computation circuitry 500 shown in FIG. 15. Numerical computation circuitry in some implementations may comprise mixed precision arithmetic logic unit 502(1), 502(2), 502(N) coupled to respective accumulators 504 and output circuits 506 shown conceptually. An example more detailed mixed precision arithmetic logic unit 502 circuit and its associated operation with memory and instruction formats is described in detail in US2015/0169289, incorporated herein by reference. Each such ALU 502 has a select input that controls it to operate in full or half precision. A training state machine/controller 508 (which may constitute a CPU 1008 executing instructions stored in non-transitory memory device 510, but could also comprise a gate array or any other implementation) may provide a scale factor S as an input operand to the ALU(s) 502 to perform the loss value scaling and weight gradient (or other) computations described above. The training state machine/controller 508 may also switch the ALUs 502 to reduced precision mode to perform, among other training computations, back propagation gradient computations. Such control can be provided as part of packed instruction formats sent over a parallel bus.

Computer programs, or computer control logic algorithms, may be stored in the main memory 1010 and/or the secondary storage 1014. Such computer programs, when executed, enable the system 1000 to perform various functions. The memory 1010, the storage 1014, and/or any other storage are possible examples of computer-readable media.

The system 1000 may include a secondary storage 1014 such as, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner In one embodiment, the architecture and/or functionality of the various previous figures may be implemented in the context of the central processor 1008, the graphics processor 1004, an integrated circuit (not shown) that is capable of at least a portion of the capabilities of both the central processor 1008 and the graphics processor 1004, a chipset (i.e., a group of integrated circuits designed to work and sold as a unit for performing related functions, etc.), and/or any other integrated circuit for that matter.

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

Still yet, the architecture and/or functionality of the various previous figures may be implemented in the context of a general computer system, a circuit board system, a console system dedicated for entertainment purposes, an application-specific system, and/or any other desired system. For example, the system 1000 may take the form of a desktop computer, laptop computer, server, workstation, game consoles, embedded system, and/or any other type of logic. Still yet, the system 1000 may take the form of various other devices including, but not limited to a personal digital assistant (PDA) device, a mobile phone device, a television, etc.

Further, while not shown, the system 1000 may be coupled to a network (e.g., a telecommunications network, local area network (LAN), wireless network, wide area network (WAN) such as the Internet, peer-to-peer network, cable network, or the like) for communication purposes.

System 1000 and the techniques disclosed herein can be used for any of a variety of applications, including but not limited to autonomous or assisted vehicle control (e.g., vehicle, pedestrian and landmark identification for driver assistance and/or autonomous vehicle pattern recognition and decision making), computer vision, image recognition, speech recognition and/or translation, natural language processing, life sciences such as medical diagnosis support and personalized therapies at the cellular level, medical imaging and genomics, smart cities or other massive multi-image environments such as warehouse and other enterprise management, video analytics, multi-object classification, facial recognition, behavioral analysis, cybersecurity, archiving, emergency response, battling global poverty, virtual reality, robotics, object tracking, fashion assistance, architecture, education, product design, travel management such as aircraft tracking, musical composition and many other applications in a variety of fields.

While the invention has been shown and described with reference to particular embodiments, it will be understood to those skilled on the art that various changes in form and detail may be made without departing from the scope of the invention as defined by the appended claims. Those skilled in the art to which this application relates will appreciate that other and further additions, deletions, substitutions and modifications may be made to the described embodiments.

The invention claimed is:

1. A processor comprising:
   at least one or more circuits to cause one or more neural network loss values to be scaled based, at least in part, on one or more gradients associated with the one or more neural network loss values.

2. The processor of claim 1, wherein the one or more circuits are to further reduce the one or more gradients in a way that is inversely proportional to the scaling.

3. The processor of claim 1, wherein the one or more circuits are to further cause the one or more neural network loss values to be further scaled based, at least in part, on a hyperparameter.

4. The processor of claim 1, wherein the one or more circuits are to further cause the one or more neural network loss values to be further scaled based, at least in part, on an automatically-selected scaling factor.

5. The processor of claim 1, wherein one or more circuits are to further select a scaling factor for each iteration of training of one or more neural networks based on a largest magnitude of the one or more gradients that are determined in a last iteration.

6. The processor of claim 5, wherein an upper bound on the scaling factor is $u=\log_2(2^{15}-x)$ x being the largest magnitude of the one or more gradients.

7. The processor of claim 6, wherein one or more circuits are to further reduce the scaling factor by a constant to prevent overflow.

8. The processor of claim 6, wherein the one or more neural networks are trained based, at least in part, on the reduced scaling factor.

9. The processor of claim 1, wherein the one or more circuits are to further modify the one or more gradients by an amount inversely proportional to a factor used to scale the loss value before using the one or more gradients to adjust one or more weights of the one or more neural networks.

10. The processor of claim 1, wherein the one or more circuits are to further update one or more weights by combining the one or more gradients with a further parameter that is adjusted based, at least in part, on the one or more scaled neural network loss values.

11. The processor of claim 10, wherein the parameter comprises learning rate.

12. The processor of claim 10, wherein the parameter comprises gradient clipping threshold.

13. The processor of claim 10, wherein the parameter comprises weight decay.

14. A system comprising one or more processors to cause one or more neural network loss values to be scaled, at least in part on, one or more gradients associated with the one or more neural network loss values.

15. The system of claim 14, wherein the one or more processors are to further reduce the one or more gradients by a factor used to scale the one or more neural network loss values before using them to adjust one or more weights of the one or more neural networks.

16. The system of claim 14, wherein the one or more processors are to further compute the one or more gradients using reduced precision.

17. The system of claim 14, wherein the one or more processors are to further compute the one or more gradients at a lower precision than is used for at least some computations associated with forward processing of data used to train the one or more neural networks.

18. The system of claim 14, further comprising computing the one or more gradients using half precision while recovering zeroes and normalizing denormals due to the half precision.

19. A non-transitory memory storing instructions that when executed by at least one processor, control the at least one processor to cause one or more neural network loss values to be scaled based, at least in part on, one or more gradients associated with the one or more neural network loss values.

20. A mixed precision computing component comprising one or more circuits to cause one or more neural network loss values to be scaled based, at least in part on, one or more gradients associated with the one or more neural network loss values.

21. The component of claim 20, wherein the numerical computation one or more circuits are further to develop the one or more neural network loss values using a reduced precision mode, and to compute weight updates to the one or more neural networks using other than the reduced precision mode.

22. The component of claim 20, wherein a factor to scale the one or more neural network loss values is based, at least in part, on at least one magnitude of the one or more gradients.

23. A computing arrangement comprising:
   one or more processors to cause one or more neural network loss values to be scaled based, at least in part on, one or more gradients associated with the one or more neural network loss values.

24. A method comprising causing one or more neural network loss values to be scaled based, at least in part on, one or more gradients associated with the one or more neural network loss values.

25. The method of claim 24, further comprising determining a factor to multiply or divide the one or more gradients based, at least in part, on the one or more neural network loss values.

26. The method of claim 24, further comprising modifying a learning rate based, at least in part, on the one or more gradients.

27. A method of modifying a deep neural network training system to permit lower precision computation of gradients while avoiding numerical computation problems associated with zeros and denormals due to use of the lower precision gradient computation, comprising:
   inserting a first code instruction(s) that scales at least one value used in a back propagation computation of the gradients; and
   inserting a second code instruction(s) that compensates a gradient-based weight update based, at least in part, on the at least one scaled value.

28. The method of claim 27, wherein the at least one value comprises a loss value, and the first code instruction(s) automatically develop a scale factor used to scale the loss value.

29. A method of controlling a deep neural network training system to permit lower precision computation of gradients while avoiding numerical computation problems associated with zeros and denormals due to use of said lower precision gradient computation, comprising:

inputting a first hyperparameter that scales at least one value used in a back propagation computation of the gradients; and inputting a second hyperparameter that compensates a gradient-based weight update based, at least in part on, the at least one scaled value.

30. A deep neural network comprising layers each comprising at least one artificial neuron, each layer having a weight associated therewith, the weight having been trained by performing computations associated with processing of training data through the deep neural network to develop a loss value and back propagating the loss value through the deep neural network to compute, at reduced precision, a gradient used to update the weight, contribution of the computed gradient to the trained weight having been adjusted to compensate a scale factor used to enable computation of the gradient at the reduced precision while normalizing denormals and recovering zeros that would otherwise have occurred due to the reduced precision.

31. A method to train one or more neural networks using reduced precision comprising causing one or more neural network loss values to be scaled based, at least in part on, one or more gradients associated with the one or more neural network loss values.

32. A method comprising iteratively:

forward propagating training data through a deep neural network to develop a loss value;

back propagating the loss value through the deep neural network to develop weight gradients; and configuring the back propagating to recover zeros and normalize denormals without adversely affecting a subsequent weight update based on the weight gradients.

* * * * *